Nov. 12, 1963  D. E. VALVERDE  3,110,340
PANEL FABRICATING MACHINE
Filed Sept. 16, 1960  6 Sheets-Sheet 1

INVENTOR.
DAVID E. VALVERDE
BY
Salvatore G. Militana
ATTORNEY

Nov. 12, 1963     D. E. VALVERDE     3,110,340
PANEL FABRICATING MACHINE

Filed Sept. 16, 1960     6 Sheets-Sheet 2

INVENTOR.
DAVID E. VALVERDE
BY
*Salvatore N. Militano*
ATTORNEY

INVENTOR.
DAVID E VALVERDE

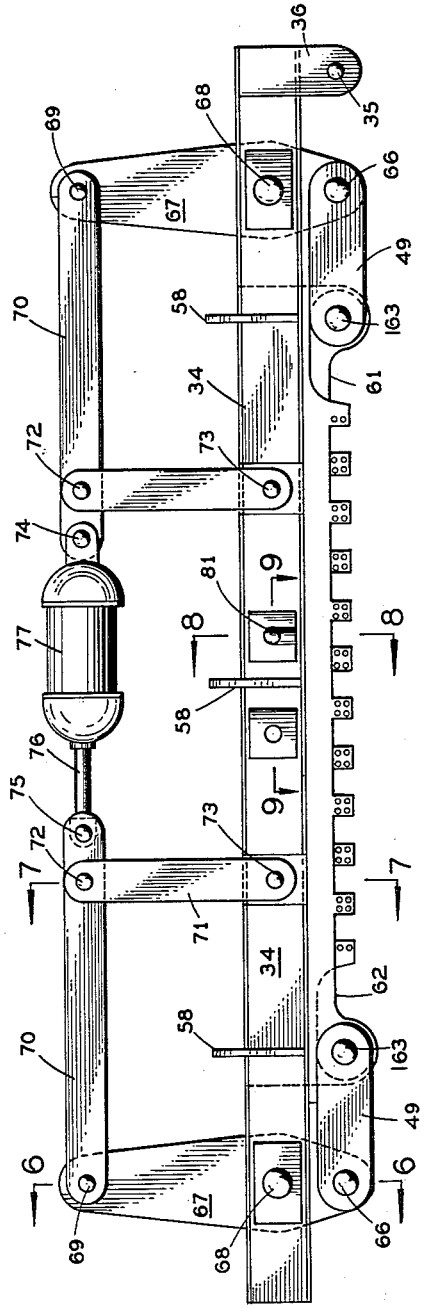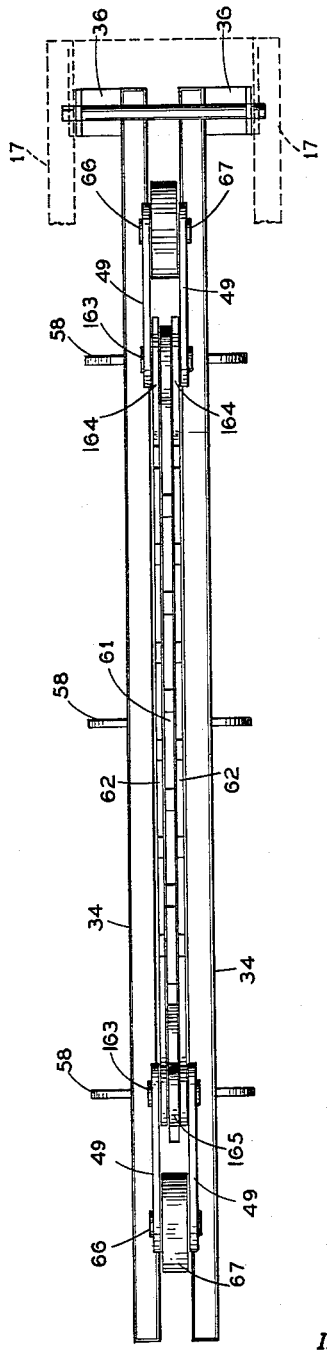

Nov. 12, 1963 D. E. VALVERDE 3,110,340
PANEL FABRICATING MACHINE
Filed Sept. 16, 1960 6 Sheets-Sheet 5

*INVENTOR.*
DAVID E. VALVERDE
BY
*Salvatore G. Militara,*
ATTORNEY

Nov. 12, 1963 D. E. VALVERDE 3,110,340
PANEL FABRICATING MACHINE
Filed Sept. 16, 1960 6 Sheets-Sheet 6

INVENTOR.
DAVID E. VALVERDE
BY
ATTORNEY

United States Patent Office 3,110,340
Patented Nov. 12, 1963

3,110,340
PANEL FABRICATING MACHINE
David E. Valverde, Miami, Fla., assignor, by mesne assignments, to Metallic Engineering Co. Inc., Miami, Fla., a corporation of Florida
Filed Sept. 16, 1960, Ser. No. 56,600
5 Claims. (Cl. 153—21)

This invention relates to panel fabricating machines and is more particularly directed to the fabrication of the tracery type panels without the use of such fasteners as bolts, screws, etc., nor welding or soldering for fastening the various parts together.

In my copending application Serial No. 850,831, filed on November 4, 1959 entitled Wall Facing, I show and describe panel structures of the tracery type which consist in general of a plurality of equally spaced and parallel stiles with tracery bars in an undulating fashion extending from one stile to the other and back in a manifold of designs. The stiles are best described as double slotted I-bars in cross section with a web portion positioned between the double ended slots. At the position of contact of the tracery bar and the web portion of the stiles, the inner flanges of the stiles are upset against the tracery bar by the panel fabricating machine to fasten the stile and the tracery bars together securely. The present invention contemplates the speedy and accurate and automatic operation of the machine on the fabrication of these panels.

Therefore, a principal object of the present invention is to provide a power operated machine for the mass production of tracery type panels which are relatively inexpensive in cost and may be produced by non-skilled labor.

Another object of the present invention is to provide a pneumatically operated machine for fastening a pluraltiy of tracery bars to stiles by an upsetting operation to form panel structures of different designs.

Another object of the present invention is to provide a panel fabricating machine described as above which is readily operated with settings thereon for accurately positioning the device along the panel and means for preventing the operation of the wrong tools or dies.

A further object of the present invention is to provide a panel fabricating machine which is readily adjusted for fabricating many designs of panels of the tracery type.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

FIGURE 1 is a front elevational view of a machine for fabricating panels of the bar tracery type constructed in accordance with my invention.

FIGURES 2 and 3 are cross sectional views taken along the lines 2—2 and 3—3 respectively in FIGURE 1 with the panels removed.

FIGURE 4 is a side elevational view of the upsetting power tool as seen removed from the machine.

FIGURE 5 is a bottom plan view thereof.

FIGURES 6, 7, 8 and 9 are cross sectional views taken along the lines 6—6, 7—7, 8—8 and 9—9 respectively in FIGURE 4.

Figures 9, 10:
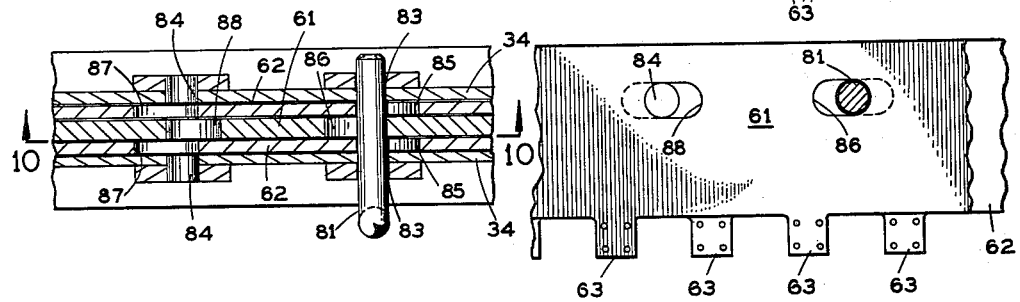

FIGURE 10 is a side elevational view of that portion of the upsetting tool shown in FIGURE 9.

Figure 11:
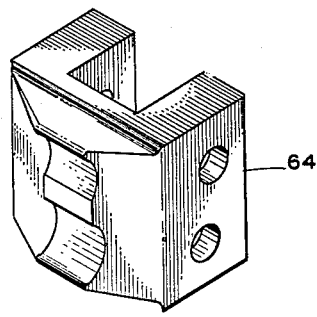
Figure 12:
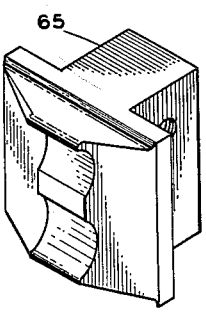

FIGURES 11 and 12 are perspective views of the tools or hammers.

Figure 13:
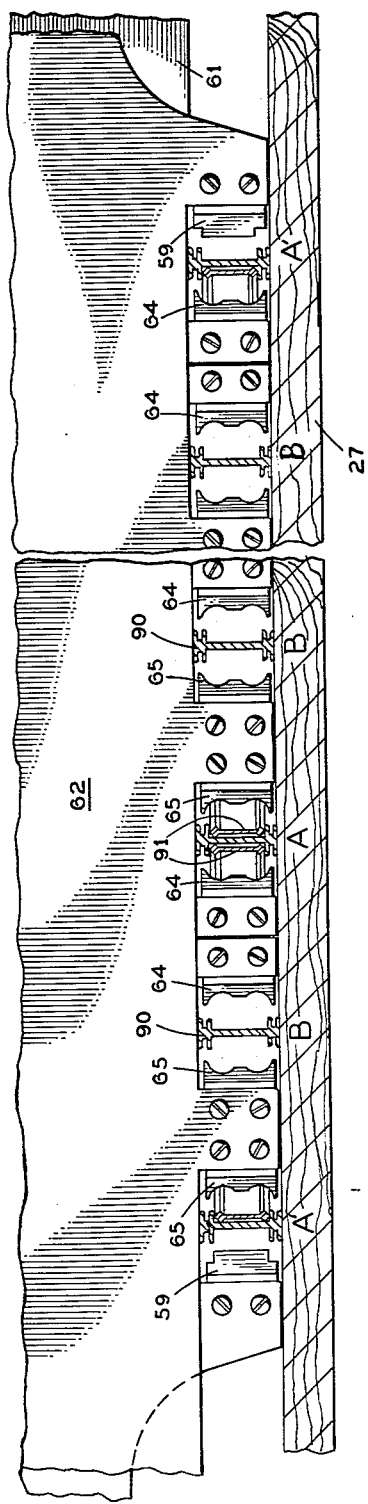

FIGURE 13 is a fragmentary side elevational view of the upsetting tool showing the dies in position prior to the tracery bars being upset or fastened to the stiles.

Figure 14:
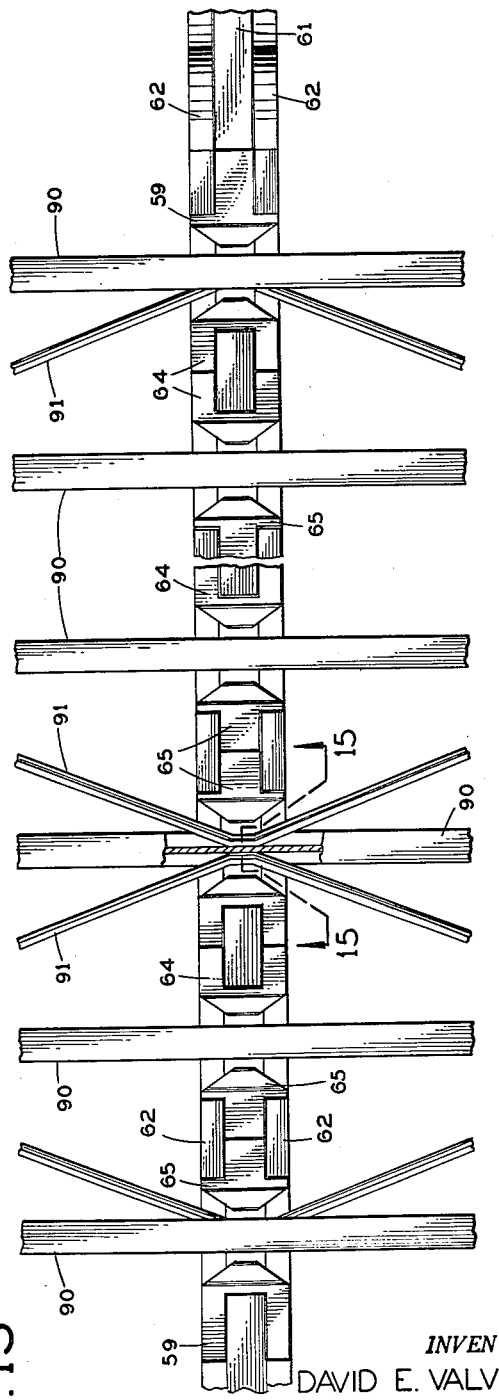

FIGURE 14 is a plan view with parts broken away of the panels showing the manner in which the dies upset the tracery bars for securing the various parts together.

Figure 15:
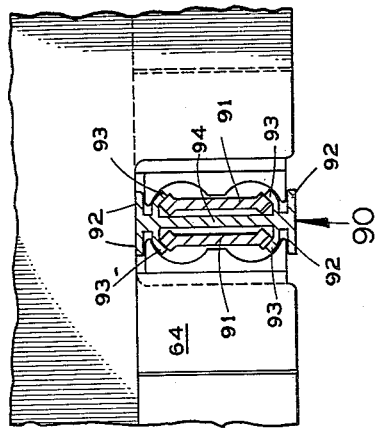

FIGURE 15 is a cross sectional view taken along the line 15—15 in FIGURE 14, showing a stile with a tracery bar fastened by the machine on each side thereof.

Referring to the drawings wherein like numerals are used to designate similar parts throughout the several views, the numeral 10 refers generally to my panel fabricating machine shown mounted along a track system adjacent to a panel support 11 for fabricating a panel P. The panel fabricating machine 10 is shown mounted at an oblique angle in approximate parallel position with the panel support 11 which is shown in a fixed position. This arrangement has been found to be most convenient to the operator of the machine, however, the panel fabricating machine 10 can be positioned, horizontally or vertically as desired. Also, the panel fabricating machine 10 can be made stationary while the panel support apparatus 11 can be made to move along the stationary panel fabricating machine 10 if desired.

The machine 10 is capable of fabricating a plurality of various designed panels of the tracery type some of which are shown and described in detail by my copending application No. 850,831 one of which, panel P is shown herein by way of illustration. Panel P among other tracery type panels consists of a plurality of stiles 90 in spaced parallel relation with tracery bars 91 extending between the stiles 90 in any undulating fashion to form a desired design. The stiles 90 have a pair of aligned slots at each end as best seen by FIGURE 15 formed by spaced flanges 92 and 93 at each end and on each side of the web portion 94. The tracery bars 91 which contact the stiles 90 are fastened at their position of contacts by upsetting the ends of the flanges 93 against the edges of the tracery bars 91 thereby avoiding the use of bolts, screws or the need of soldering or welding. The machine 10 performs the aforesaid upsetting operation as is explained in detail hereinafter to fasten the tracery bars 91 and the stiles 90 together to form a complete panel structure P. In the normal operation of this panel fabricating machine, the stiles 90 and tracery bars 91 are placed on a panel support 11 in any desired design. Then the machine 10 is moved along the support 10 to fasten the tracery bars 91 and stiles 90 together.

The panel fabricating machine 10 constitutes a carriage which is supported at its upper end by a plurality of grooved rollers 12 riding on a pair of tracks 13 which is mounted on a wall 14. The rollers 12 are rotatably mounted on axles 15 secured to a cross member 16 forming a part of the support frame for the mechanism of the panel fabricating machine 10. Side channel members 17 join the cross member 16 at their upper ends and extend substantially diagonally toward the floor 18 which supports a further inverted V-shaped track 19. On the track 19 there are a plurality of grooved rollers 20 rotatably supported thereon by means of an axle 22 extending between a pair of channel members 21. The channel members 21 are welded or otherwise secured together by a plate 23 to which the lower ends of the side channel members 17 are welded or otherwise secured to.

It is noted that the above described construction permits the sliding of the panel fabricating machine 10 in substantially spaced and parallel relation to the panel support 11 on which is placed a panel P that is to be fabricated as explained in greater detail hereinafter. The panel support 11 consists of a table top portion 27 placed in an oblique position by legs 28, 29 and cross braces 30. At the lower edge of the table top 27 there is mounted on angle member 31, one of whose leg portions supports the panel parts P placed on the table 27 being fabricated, while the other leg portion is provided with a plurality of bores 32 for receiving a pin 33 for locking the machine 10 in position as is explained in greater detail hereinafter.

Figure 2:
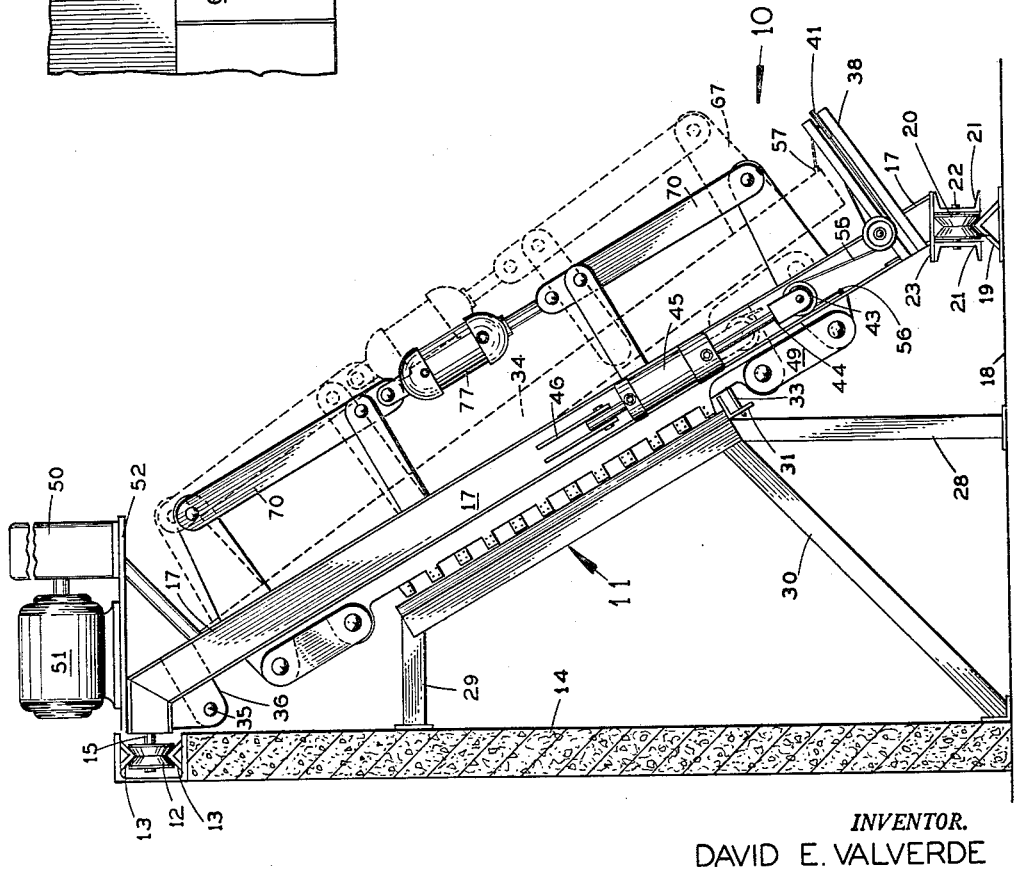

Mounted on and carried by the carriage is the operating mechanism consisting of a pair of die supporting channel members 34 secured together in spaced relation to each other with the upper end provided with depending lugs 36 pivoted by a pivot pin 35 to the channel members 17 as shown in detail by FIGURES 4 and 5. The lower end of the channel members 34 rest on a cross bar 37 extending between the channel members 17 so that the lower ends of the die supporting channel members 34 are free to swing upwardly. The die carrying channel members 34 are in their operating position when their lower ends are resting on the cross bar 37 and when the machine 10 is to be moved to a new position along the die carrying panel support 11, the die carrying channel members 34 are swung upwardly out of the way of the panel P being fabricated. This is accomplished by a pulley system comprising an upstanding pulley support 38 on which pulleys 40 and 41 are rotatably mounted. Lying on a plane alongside the pulley 41 is a third pulley 42 rotatably mounted on the side of the channel member 17 in alignment with a pulley 43 rotatably mounted on the end of a piston rod 44. A fluid pump 45 which is mounted on a bracket 46 alongside one of channel members 17 is provided with a pair of high pressure hoses 47 and 49 extending from a multiple valve control box 48. Fluid pressure for the operation of the fluid pump 45 is generated by a pump 50 actuated by an electric motor 51 all of which are mounted on a stand 52 as best shown by FIGURE 2. A pair of high pressure hoses 53 and 54 convey the fluid to and from the pump 50 and the multiple valves (not shown) positioned within the control box 48. With a cable 55 secured at one end as at 56 to the channel member 17 and wound about the pulleys 43, 42, 41 and 40 and the other end secured as at 57 to the foot or lower end of the channel members 34, operation of the operating lever 60 will effect a change of position of the die supporting channel members 34.

By actuating the operating lever 60 in one direction, the pump 50 will direct the flow of fluid under pressure through the hose 53 to the multiple valve within the valve control box 48. The fluid under pressure will flow into the hose 49 to cause the piston within the pump 45 to move upwardly and retract the piston rod 44, thereby carrying the pulley 43 and drawing the cable 55 (see FIGURE 2). This causes the die supporting channel members 34 to be pivoted about the pivot shaft 35 and the lower end of the channel members 34 to be lifted to the dotted line position away from the panel support table 27.

When the operating lever 60 is actuated to the opposite position, the fluid under pressure is now directed through the hose 47 to the pump 45 to cause the piston to move downwardly and the piston rod 44 to move outwardly of the pump 45. This causes the cable 55 to move in the direction away from the pump 45 and thereby permit the foot of the die carrying channels 34 to become lowered by gravity to the support bar 37 and be in position to fabricate the panel P as is explained in greater detail hereinafter.

Slidably mounted between the channel members 34, 34 are two sets of die holders, one of which consists of a single plate member 61 medially disposed between the channel members 34, 34; while the second set of die holders consists of a pair of spaced plate members 62, whereby one plate member 62 is positioned on each side of the plate member 61 as best shown by FIGURES 4–9 inclusive. Each of the plate members 61 and 62 are provided with a plurality of equally spaced depending tabs 63 to which dies or tools 64 or 65 are secured, the dies 64 being secured by screw bolts to the center plate member 61 while the dies 65 being secured by screw bolts to the two outer plate members 62. Except for the end most tabs 63 on which are secured blank dies 59 each tab 63 is provided with a pair of tools or dies 64 or 65 placed back to back as shown by FIGURE 13. The end tabs 63 are provided with only one tool 59 which are blanks. Gusset plates 58 maintain the members 61, 62 in close sliding relationship (see FIGURES 4 and 8).

The tool carriers 61 and 62 as well as the channel members 34 are provided with two sets of aligned bores for receiving a lock pin 81. The channel members 34 are provided with circular bores 83, 84. The bores 83 being in alignment as well as the bores 84, see FIGURES 9 and 10, so that when the lock pin 81 is inserted therethrough, the lock pin 81 will be held securely against movement. The die carrying members 61, 62 are provided with elongated bores or slots 85, 86, 87 and 88, the member 61 being provided with elongated and aligned slots 86 and 88 while each of the die carrying members 62 having aligned slots 85 and 87. All of the bores 83, 84 and slots 85, 86, 87 and 88 are so positioned that if the locking pin 81 were placed simultaneously in the bores 83 and 84 and extending through the slots 85, 86, and 87, 88, the die carrying members 61 and 62 would be locked in position and would be unable to move with relation to each other. Upon inserting the lock pin 81 in the bores 83, 85, 86 as shown in FIGURE 9, the die carrying member 61 can slide to the right until the left edge of the slot 86 strikes the pin 81 as the die carrying members 62 slide to the left approximately the same distance until the right edges of the slots 85 strike the pin 81. The dies or upsetting tools 64 are carried to the right while the tools 65 have moved to the left as viewed in FIGURES 13 and 14. The die carrying members 61 and 62 can slide in the reverse direction to its original position shown by FIGURE 9, but not any further. If it is desired that the die carrying member 61 be made to slide to the left and the die carrying members 62 slide to the right, then the lock pin 81 is removed from the bores 83 and inserted in the bores 84. Now, the die carrying member 61 is free to slide to the left until the right edge of the slot 88 strikes the lock pin 81 and the die carrying members 62 will slide to the right a distance equal to the length of the slots 87. Upon reversing the power mechanism of the machine 10, the die carrying members 61 and 62 can be made to slide back to their original positions, the lock pin 81 in the bores 84 preventing the die carrying members 61 and 62 from sliding beyond their original positions.

At one end of each of the die carrying plate members 61, 62 there is a pair of links 49 pivotally mounted by a pivot pin 163 thereto. The die carrier 61 which is medially positioned between the die carrier 62 is provided with a spacer 164 on each side thereof at the position of the pivot pin 163 so as to provide a support for the ends of the die carriers 62 which rest thereon. The die carriers 62 are provided with a medially positioned spacer 165 at the position of its pivot pin 163 in order to provide a support for the end of the die carrier 61. The outer ends of the links 49 are pivoted as at 66 to the lower end of upright lever arms 67 which are pivoted, as at 68 to the channel members 34, 34. The upper end of each of the lever arms 67 are pivotally secured as at 69 to one end of a pair of links 70. As a support for the links 70, an upright link 71 is pivotally secured to each of the links 70 as at 72 while the lower ends of the links 71 are pivotally supported as at 73 to the channel members 34. Interposed between the ends of the two pairs of links 70 is a fluid pressure operated pump having a cylinder 77 pivotally secured as at 74 to the end of one of the links 70, while the other link 70 is pivotally secured as at 75 to a piston rod 76.

The piston rod 76 extends into the cylinder 73 and is secured to a conventional piston (not shown).

At the ends of the cylinder 77 there are connected fluid pressure hoses 78 and 79 for directing fluid under pressure to and from both sides of the piston within the cylinder 77. The hoses 78 and 79 are connected to the valve control box 48 to permit fluid pumped by the pump 50 and flowing to and from the valve control box 48 through the hoses 53 and 54 to flow through a valve not shown but actuable by an operating lever 80 to flow to the desired side of the cylinder 77. Upon actuation of the operating lever 80 in either of two directions, fluid under pressure will flow from the pump 50 through the hose 53 to the control box 48 and the hose 78 or 79 to the lower or upper end of the cylinder 77 to cause the piston and piston rod 76 to move inwardly or outwardly of the cylinder 77 and the fluid within the opposite end of the cylinder 77 to flow out of the cylinder 77 and through the other of hoses 78 or 79 then through the hose 54 back to the pump 50.

The panel fabricating machine 10 is provided with means for positioning the tools or dies 59, 64 and 65 at the proper position for upsetting the inner flanges 93 against the tracery bars 91. Of course, this position on the panel support 11 is varied as determined by the design of the panels. For the panel P shown, the bores 1 through 9 on the angle member 31 indicate the positions at which the die carrying members 61 and 62 must lie in order to effect the upsetting operation. These positions of the machine 10 along the panel support P are readily assumed by the retractable pin 33 mounted for sliding movement on one of the channel members 17. The pin 33 extends below the level of the die carrying members 61 and 62 and is received by the station bores 32. An operating member 96 used for actuating the pin 33 is secured at its lower end to a lever 97 which is pivotally mounted as at 98 at its mid point and pivotally secured as at 99 to the upper end of the retractable pin 33. Upon the application of a downward force on the handle 96, the lever 97 is pivoted about the pivot pin 98 causing the retractable pin 33 to slide upwardly out of one of the bores 32. An upward force on the handle 96 will cause the pin 33 to slide downwardly into the desired station bore 32.

Figure 1:
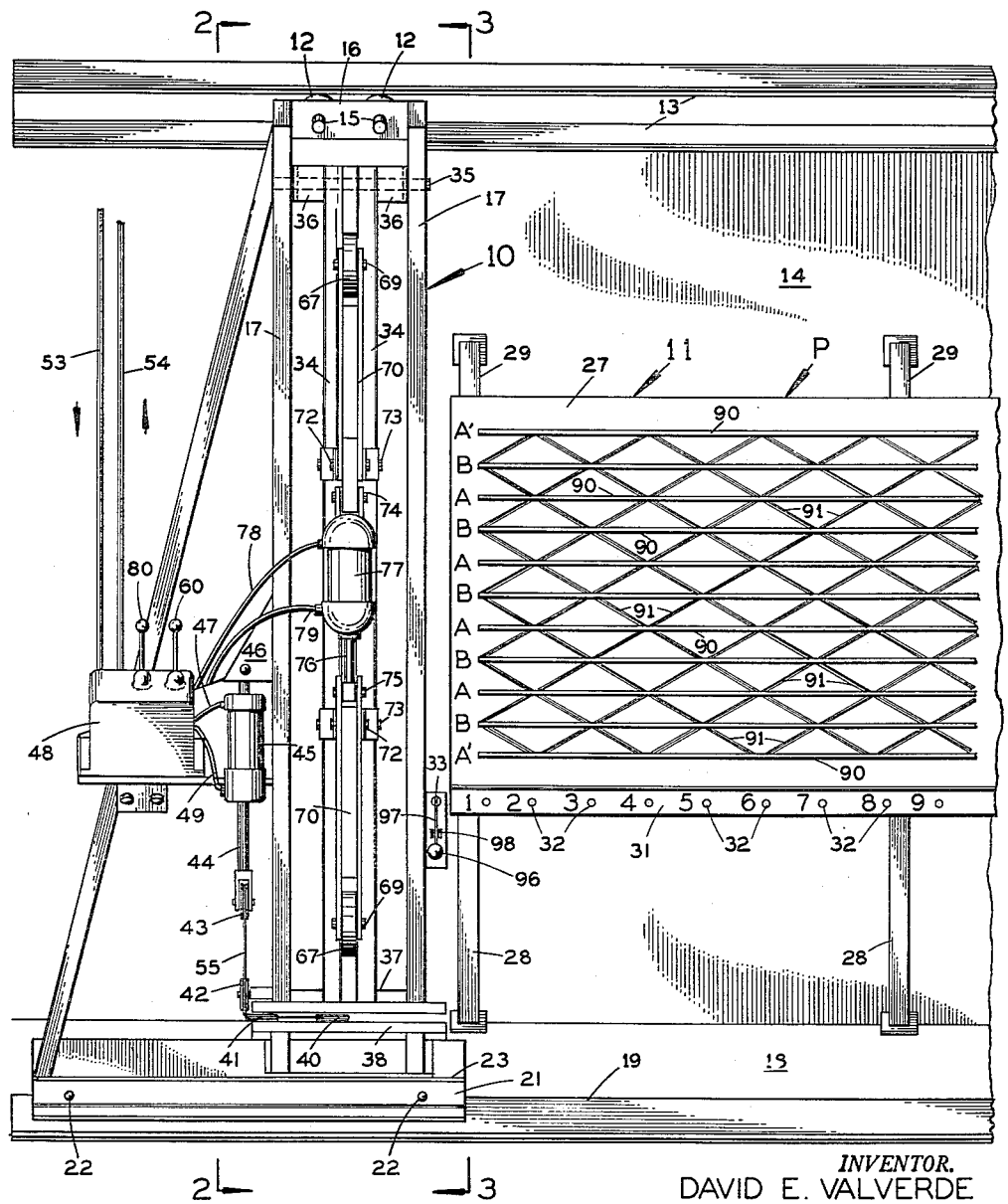
Figure 3:
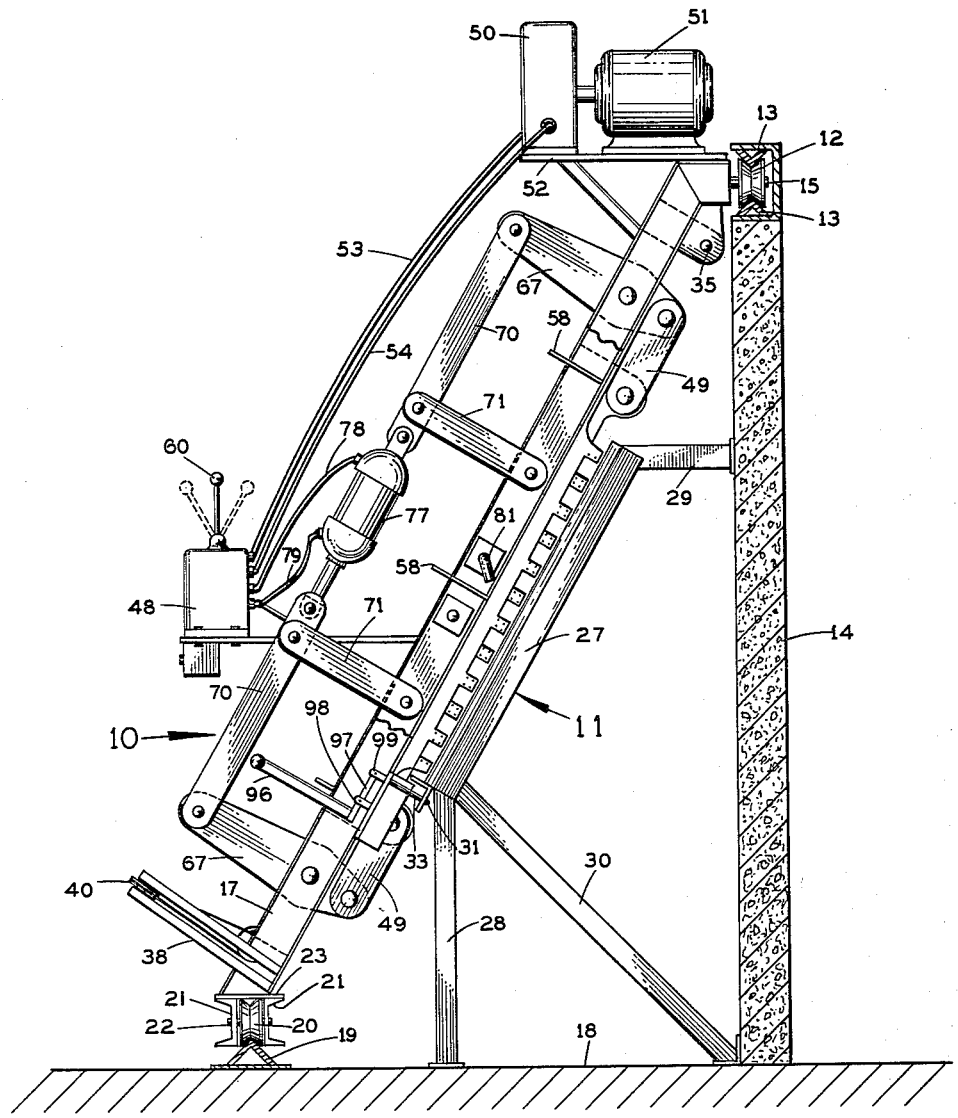
Figure 6:
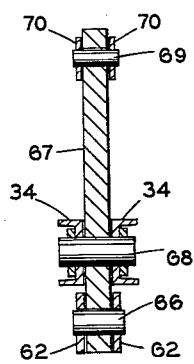
Figure 7:
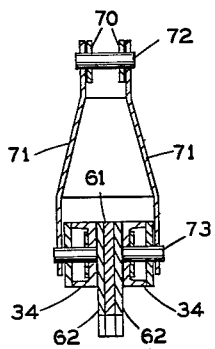
Figure 8:
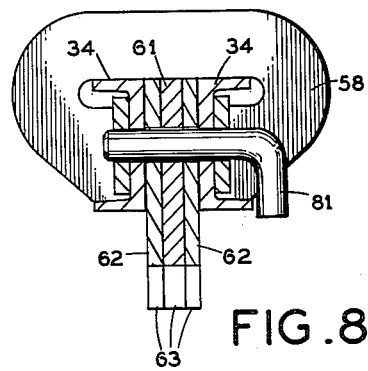

In the normal operation of the panel fabricating machine 10, the device 10 is positioned beyond the edge of the panel support 11 as shown by FIGURE 1 and the die support frame 34, 34 is pivoted to its upper or non-operative position as shown by dotted lines in FIGURE 2. This permits the operator to set up a panel structure that is to be fabricated on the table 11. The stiles 90 cut to the proper length are placed horizontally on the table 27 with the tracery bars 91 shaped according to the desired design placed between the stiles 90. Now, the operator will push bodily on the machine 10 to compel the latter to roll along the tracks 13 and 19 until the pin 33 is in alignment with the first bore 32 which is station #1. The handle 96 is pushed upwardly and the pin 33 is made to slide downwardly into the bore 32, locking the machine 10 in position. The operating lever 60 is now actuated to permit fluid under pressure generated by the pump 50 to flow through the hose 78 to cause the piston rod 44 to slide outwardly of the cylinder 45, the fluid under the piston flowing out of the cylinder 45 through the hose 49 back to the pump 50 via the hose 54. The force of gravity then causes the die carrying frame 34, 34 to swing down on the pivot pin 35 to the table 27 as shown by solid lines in FIGURES 2 and 3. The dies 59, 64 and 65 assume the position on each side of the stiles 90 as best shown by FIGURE 13. At station #1, the tracery bars 91 contact the stiles 90 only at the rows indicated by "B." Therefore, the lock pin 81 must be positioned in the bores 84, 87, 88 which will permit the dies 59, 64 and 65 to slide together at the position of those stiles 90 to be upset or fastened to the tracery bars 91.

By actuating the operating lever 80 in one direction, fluid under pressure which is pumped by the pump 50 through the hoses 53 and 78 to the top portion of the cylinder 77 causing the links 70, 70 to move in a direction away from each other as explained hereinabove. With the lock pin 81 positioned in the bores 84, 87 and 88 the die carrying member 61 will slide in a downward direction or to the left as viewed in FIGURES 13, 14 while the die carrying member 62 will slide upwardly or to the right whereby the tools 64 and 65 will slide towards each other at the stiles in the row "B." The dies 64, 65 upset the flanges 93 as shown by FIGURE 15. Now, the operator reverses the operator lever 80 and causes fluid under pressure to flow to the cylinder 77 via the hose 79 and as the piston within the cylinder moves, the fluid above the piston will flow out through the hose 78 back to the pump 50 through the hose 54. The linkage mechanism 70, 67, 49 and the die carrying members 61 and 62 will slide back to their original position, the tools 64, 65 moving away from the stiles 90. When the bores 84, 87, 88 are as shown by FIGURE 9, the lock pin 81 is removed from the bores 84, 87, 88 and inserted into the bores 83, 85, 86.

The operator now manipulates the operator lever 60 to permit fluid under pressure to flow through the hose 49 retracting the piston rod 44 and causing the tool supporting members 34, 34 to pivot about the pin 35 and swing upwardly to the dotted line position shown in FIGURE 2. The machine 10 is now clear of the panel P. The lever 96 is actuated to lift the pin 33 from station #1 bore 32 and the machine 10 is forced to slide by the rollers 12, 20 on the tracks 13, 19 to the station #2, when the lever 96 is actuated again to slide the pin 33 into the bore 32 at station #2. The operator lever 60 is actuated to return the tool supporting members 34, 34 to swing downwardly to its operating position when the tools 59, 64 and 65 will straddle the stiles 90 and tracery bars 91 to fasten same together. The lock pin 81 is now in the bores 83, 85, 86. The operator lever 80 is now actuated to cause the fluid pressure to flow through the hose 79 to the lower portion of the cylinder 77 and the links 70, 70 to move toward each other and the links 49, 49 away from each other. This causes the tool carrying member 61 to slide upwardly or to the right and the tool carrying member 62 downwardly or to the left, the tools 59, 64, 65 upsetting the flanges 93 onto the tracery bars 91 at the position of the stiles 90 at row A. The operator lever 80 is reversed in position and the tools 59, 64, 65 will move in a direction away from each other to their neutral position. The tool 59 is a blank because the stiles at position A' and A' are the end stiles having no tracery bars on the outer side, the blank tool 59 merely holding the stile as the tool 65 (64) upsets the flanges 93 on the other side. The tool supporting members 34, 34 are again lifted from the table 11 and the machine moved to station #3. This procedure is repeated until all of the stiles 90 and tracery bars 91 are fastened as described above when the panel P is removed and another set of stiles 90 and tracery bars 91 placed on the table 11 to be fabricated.

Having described my invention, what I claim as new is:

1. A panel fabricating machine comprising a first elongated member, said first elongated member having a plurality of spaced depending lugs, a second elongated member mounted on each side of said first elongated member, means joining said second elongated members for simultaneous sliding movement, said second elongated members having a plurality of spaced and aligned depending lugs, said last named depending lugs being positioned adjacent said first named lugs, die means mounted on each of said lugs and power operated means operatively connected to said elongated members sliding said first and second elongated members with relation to each other whereby said die means of one elongated member will be carried in the direction of the die means of the other of said elongated members.

2. A panel fabricating machine comprising a plurality of elongated die carrying members slidably mounted with relation to each other, a plurality of dies secured to said members, all of said dies lying in a plane, a support frame supporting said elongated die carrying members, pivot means mounting said elongated die carrying members to said support frame permitting said members to swing outwardly of said support frame, panel support means mounted in close proximity to said dies, roller means mounting said support frame for movement along said panel support means and power operated means operatively connected to said elongated die carrying members to slide said elongated die carrying members with relation to each other whereby said dies of one of said die carrying members will move in the direction of said dies on the other die carrying member.

3. A panel fabricating machine comprising a first elongated member, said first elongated member having a plurality of spaced depending lugs, a second elongated member mounted on each side of said first elongated member, means joining said second elongated members for simultaneous sliding movement, said second elongated members having a plurality of spaced and aligned depending lugs, said last named depending lugs being positioned adjacent said first named lugs, die means mounted on each of said lugs, a support frame supporting said elongated members, pivot means mounting said elongated members to said support frame permitting said elongated members to swing outwardly of said support frame, panel support means mounted in close proximity to said dies, roller means mounting said support frame for sliding movement along said panel support means and power operated means operatively connected to said elongated members to slide said elongated members with relation to each other whereby said die means of said first elongated member will move in the direction of said dies of said second elongated members.

4. A panel fabricating machine comprising a first elongated member, said first elongated member having a plurality of spaced depending lugs, a second elongated member mounted on each side of said first elongated member, means joining said second elongated members for simultaneous sliding movement, said second elongated members having a plurality of spaced and aligned depending lugs, said last named depending lugs being positioned adjacent said first named lugs, a pair of dies mounted on said lugs whereby a die mounted on said first elongated member extends in a direction of a die mounted on said second elongated members, a support frame supporting said elongated members, pivot means mounting said elongated members to said support frame permitting said elongated members to swing outwardly of said support frame, panel support means mounted in close proximity to said dies, roller means mounting said support frame for sliding movement along said panel support means and power operated means operatively connected to said elongated members to slide said elongated members with relation to each other whereby said dies of said one of said elongated members will move in the direction of the dies of the other of said elongated members.

5. The structure as recited by claim 4 taken in combination with stop means operatively connected to said elongated members for limiting the relative sliding movement of said elongated members and means for securing said support frame at desired position along said panel support means.

References Cited in the file of this patent

UNITED STATES PATENTS

| | | |
|---|---|---|
| 2,405,931 | Abramson et al. | Aug. 20, 1946 |
| 2,918,836 | Walker | Dec. 29, 1959 |